United States Patent [19]

Cooper

[11] 4,060,962
[45] Dec. 6, 1977

[54] FRUIT CLIPPER

[76] Inventor: James T. Cooper, 528 Maple Ave., Sebring, Fla. 33870

[21] Appl. No.: 699,508

[22] Filed: June 24, 1976

[51] Int. Cl.² .................................. A01D 46/24
[52] U.S. Cl. ........................................ 56/336
[58] Field of Search ........................ 56/333–338; 30/245–252

[56] References Cited

U.S. PATENT DOCUMENTS

| 3,374,613 | 3/1968 | McDonald | 56/334 |
| 3,507,107 | 4/1970 | Harms et al. | 56/336 |
| 3,857,227 | 12/1974 | Rosenberg | 56/335 |

FOREIGN PATENT DOCUMENTS

| 498,621 | 5/1930 | Germany | 56/336 |

*Primary Examiner*—Jay N. Eskovitz
*Attorney, Agent, or Firm*—George B. Oujevolk

[57] ABSTRACT

A fruit clipper with a scissor-like cutter at the front end. A spring is attached to the scissor-like cutter biasing the blades in the open position and a wire from the scissor-like cutter extends to a solenoid. When the solenoid is enabled, and the core of the solenoid is pulled into the coil it pulls the wire which in turn closes the cutter blades against the spring bias. Electrical contacts are on one of the blades and frame which are connected by a circuit to the solenoid so that when the contacts are joined the circuit is closed enabling the solenoid and closing the cutter blades. A scoop and chute assembly are disposed under the cutter blades and cut fruit drops into the scoop and is carried by gravity down the chute.

7 Claims, 14 Drawing Figures

FRUIT CLIPPER

BACKGROUND OF THE INVENTION

The present invention relates to a fruit cutter and more particularly to a fruit cutter which will automatically cut a fruit stem and carry the cut fruit into a receptacle.

BRIEF REVIEW OF THE PROBLEM

Fruit at present is harvested mostly by migrant workers who have little education. The fruit is usually cut with a hand cutter. If the stem is too long it damages other fruit, if cut at the junction of the fruit and stem, a tear is made in the skin which will spoil the fruit. The operation of the hand cutter is tedious and hurts the hand. Pickers do develop muscle to offset this disadvantage, but the work is nonetheless hard. Although many attempts may have been made to provide an automatic fruit picker, none as far as I am aware, have ever been successful when carried out on a commercial scale.

SUMMARY OF THE INVENTION

Generally speaking, the present invention contemplates a fruit cutter which is held by a handle attached to a flat upper frame. The upper frame has a main frame portion and a tapered end portion which terminates in a travel guide. Under the frame, and held by the frame, is a plier-like cutter having a pair of opposed cutting blades, a fulcrum, and opposed lever members. The fulcrum of the cutter is held by a travel member to the guide so that the travel member can travel along the guide, resilient means tend to keep the lever members apart so that the cutting blades are in the open position. A solenoid including a coil with a core partly outside the coil is coupled to the lever members which, when enabled, will cause the core to enter the coil bringing the lever members together and closing the cutter by bringing the blades together. Held by the upper frame under the cutter blades is a scoop into which the cut fruit will drop. The scoop is coupled to a resilient chute which will carry the fruit to a receptacle. Switch means are coupled to the cutter and the solenoid to enable the cutter at the appropriate time so as to cut fruit at the stem.

Other objects and advantages of the invention will become more apparent from the following detailed description when taken together with the accompanying drawings, in which:

DETAILED DESCRIPTION

The description of the invention which will be given herein can be divided into several broad areas:
I. The overall configuration and the objective of the fruit cutter 15;
II. The handle and frame assembly 17;
III. The cutter assembly 19;
IV. The scoop and chute assembly 21;
V. The solenoid circuit 23;
VI. Modifications of certain components;
VII. Elaboration of the working of some components.

OVERALL CONFIGURATION AND OBJECTIVE OF THE FRUIT CUTTER

As depicted in the drawing, the fruit cutter 15 is hand carried by a person who holds the device at the handle 25 which is part of the handle and frame assembly 17. The handle 25 holds an upper frame 27 which terminates in a tapered end 29. The tapered end 29 has a longitudinal slit 31 defining a travel guide for the fulcrum of the cutter assembly 19. The person holding the fruit picker 15 brings the tapered end 29 towards the fruit so that the cutter assembly is in a proper position. As will be later explained, the solenoid circuit 23 is enabled. The fruit is then cut and drops into the scoop and chute assembly 21. The fruit then travels to a receptacle which can be a bag carried by the person using a shoulder strap.

Figure 1:
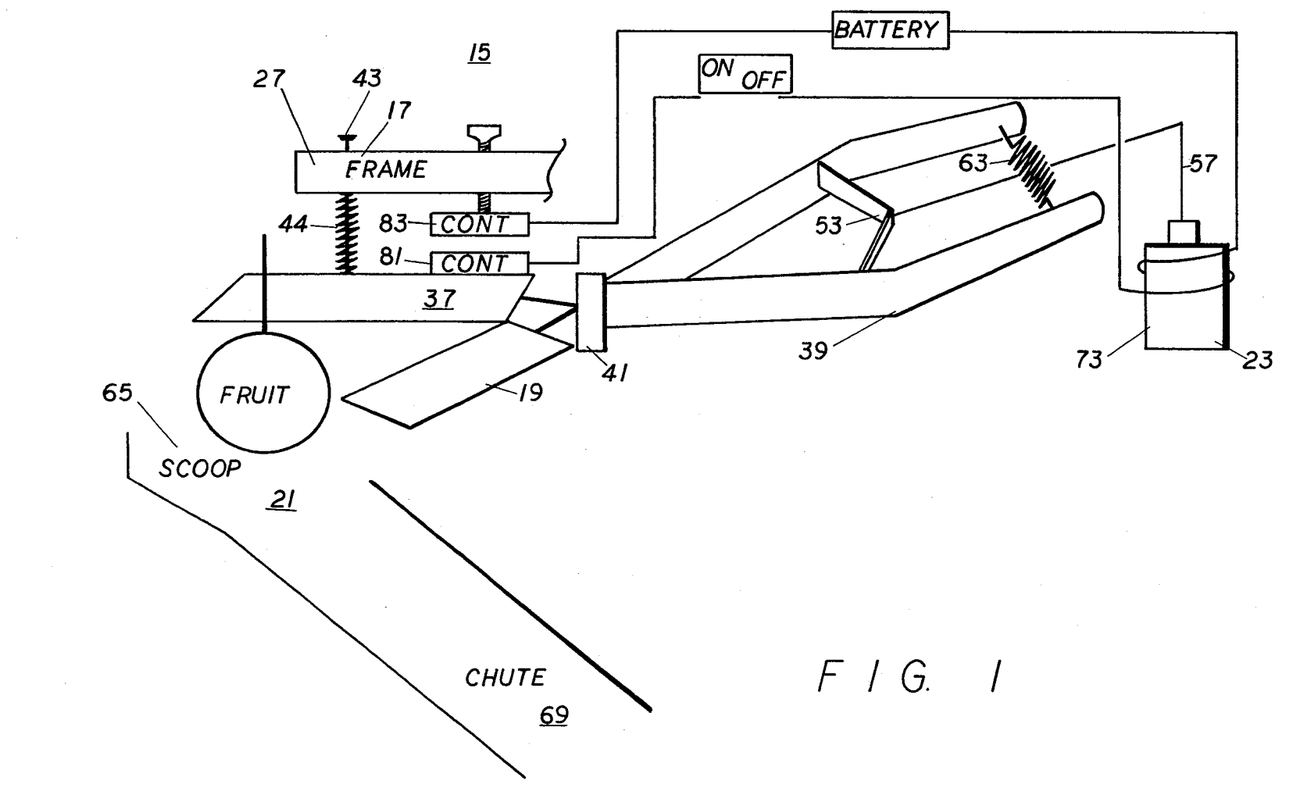
FIG. 1 is a block and schematic explanation of the device contemplated herein.
Figure 2:
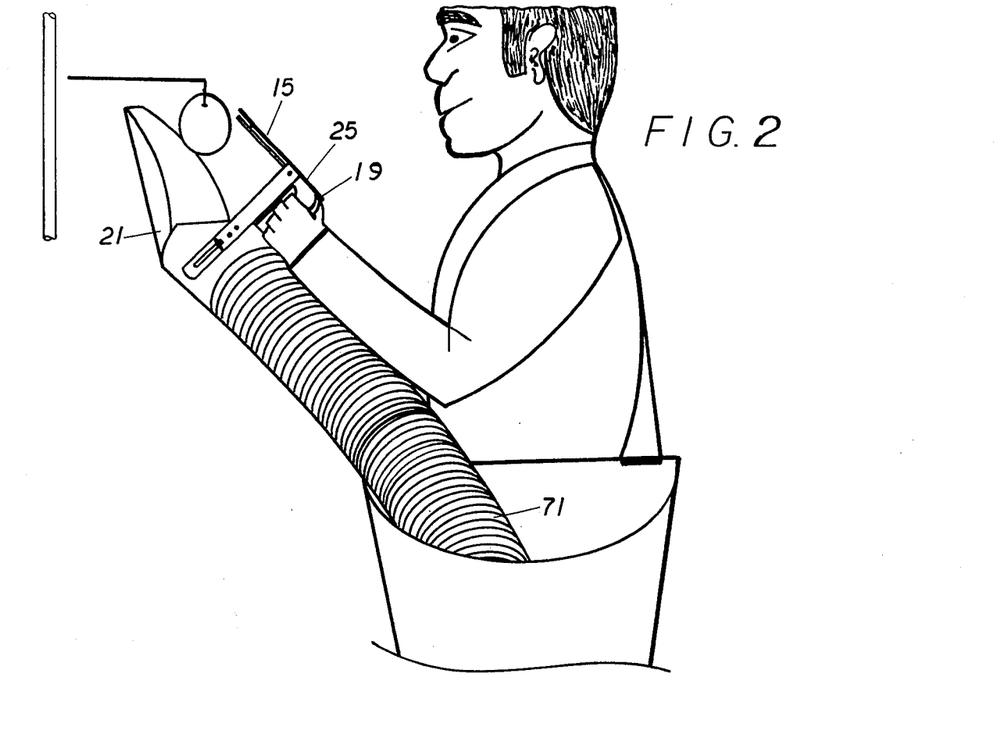
FIG. 2 is a sketch of a man having a bag-type of fruit container and carrying the fruit cutter contemplated herein.
Figure 2A:
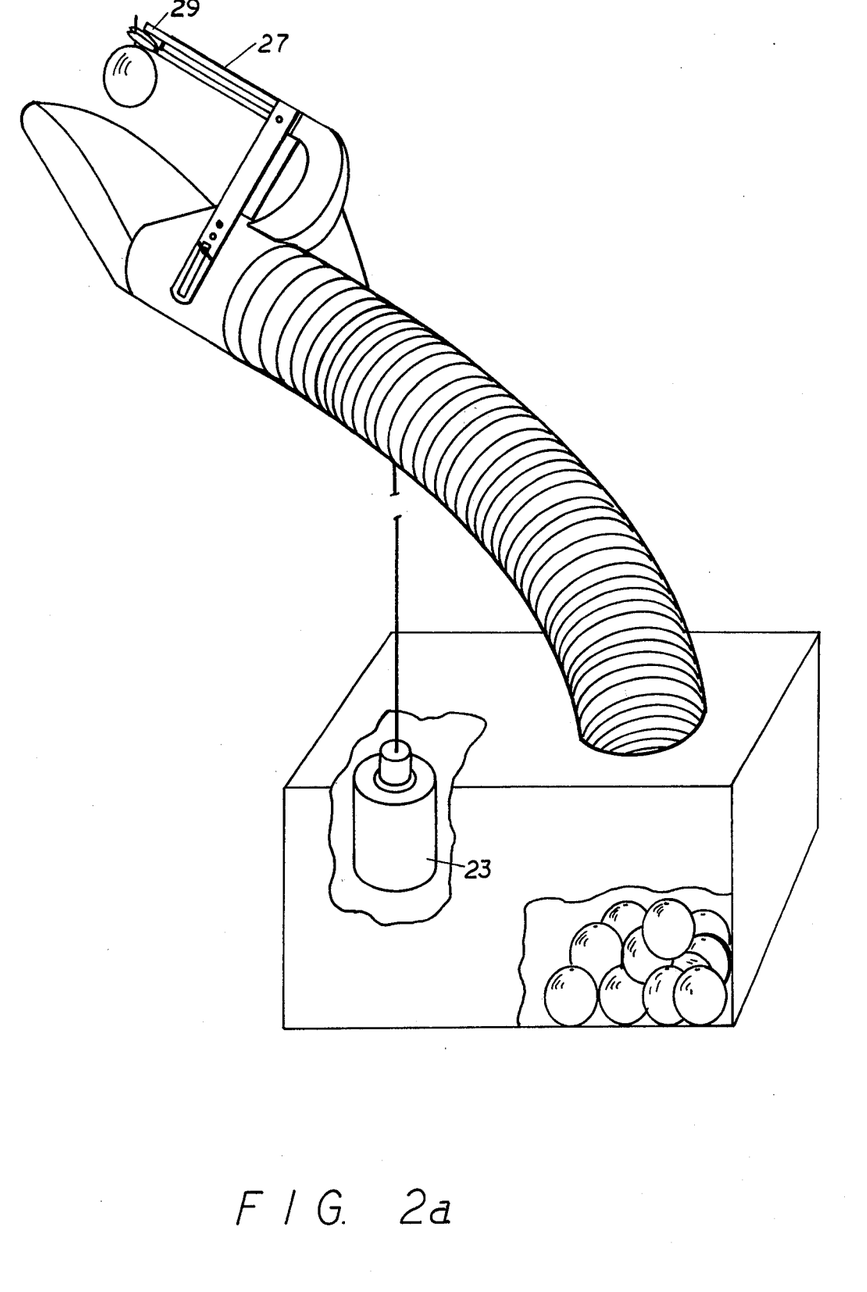
FIG. 2a is an enlarged view of FIG. 2 depicting the travel path of clipped fruit.
Figure 3:
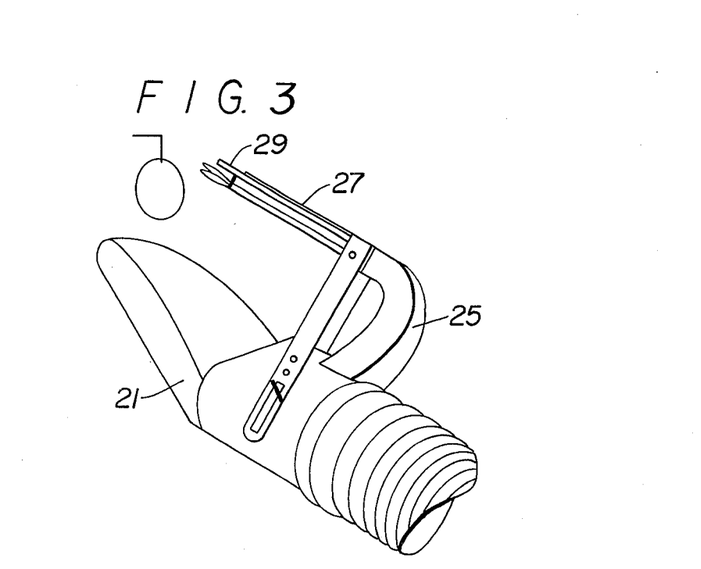
FIG. 3 shows the fruit cutter approaching a fruit.
Figure 4:
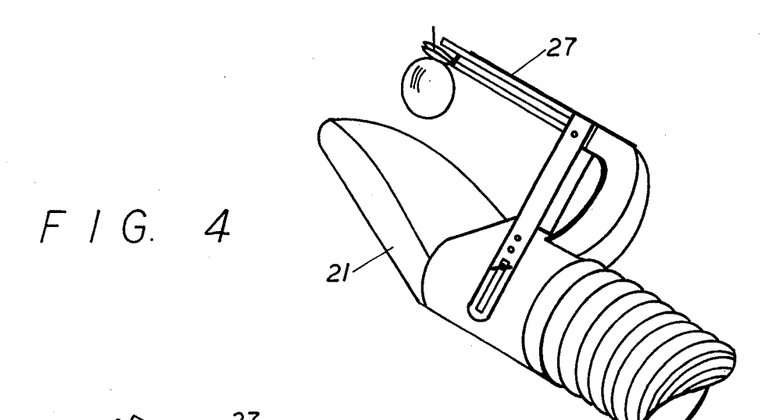
FIG. 4 shows the fruit cutter at the instant of cutting.
Figure 5:
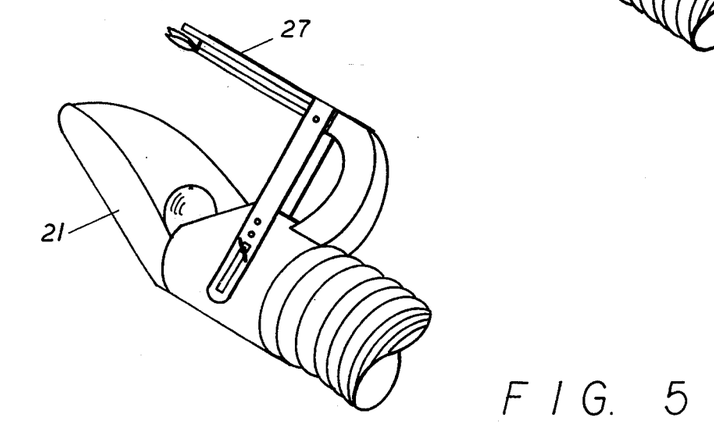
FIG. 5 depicts the cut fruit entering the scoop and on its way to the chute.

Also shown in the drawing is a theoretical schematic and block diagram explanation of the inventive concept which will be explained in greater detail herein. The fundamental units are the upper frame 27, the cutter assembly 19 with its blades 37 held by the frame 27, the cutter lever members 39 with front and rear legs, the lever members coupling pieces 53, the cutter spring 44, the rear spring 63, the solenoid 73 which is coupled to the lever member coupling pieces 53 by a wire 57, the scoop and the chute assembly 21. Electrical contact is made by the frame and cutter contacts 81, 83, one of which is adjustable, e.g., the frame contact.

The cutter is held by the frame towards the frame forward end and, under the cutter is the scoop 65 leading to a chute 69. The cutter blades extend rearward to a fulcrum 20 connected to the cutter lever members. The squeezing together of the lever arms will close the cutter blades. The lever members are closed by pulling on the coupling elements to the rear by means of a wire 57 attached to a solenoid.

The fruit is to be cut by the cutter blades 37 which are attached to the frame. The fruit is then to be propelled into the scoop and drop down the chute. Of great importance at this end of the apparatus is the cutter spring 44 and the contacts. As the cutter blades 37 hit the fruit, the cutter spring 44 is pushed upwards and depressed thus "cocking" the spring. Finally, the contacts meet. The cutter blades 37 snap shut. The cocked spring then pushes downwards on the fruit propelling it into the scoop so that it finally falls down the chute.

At the rear of the instrument is the lever spring. This lever spring is biased to keep the blades open. As the contacts meet, the solenoid pulls the coupling pieces 53 by the wire. This "cocks" the lever spring. As the fruit is propelled, the cutter spring pushes the cutter downwards opening the contacts. The coupling elements no longer hold the lever arms inwards. The cocked lever spring pushes outwards spreading the lever members apart. The blades 37 open and the apparatus is ready to cut the next piece of fruit.

THE HANDLE AND FRAME ASSEMBLY

The handle and frame assembly 17 consists of a handle 25 designed to be held in a vertical grasp. The top of the handle 25 is attached to a flat upper frame 27 which consists of a rectangular rear section 33 and a tapered front end 29. Connected to the upper frame 27 at the rear section 33 are side brackets 35. These side brackets will furnish part of the support for the cutter assembly 19 and also hold the scoop and chute assembly 21. Of great importance in the upper frame 27 is the longitudinal slit 31 at the tapered end 29. This slit 31 defines a travel guide for the fulcrum of the cutter assembly as will be described later. At the rear of the handle and frame assembly is a rear bracket 36.

THE CUTTER ASSEMBLY

Disposed under the upper frame 27 is the cutter assembly 19. The cutter assembly 19 consists of a plier-like cutter 20 having a pair of opposed cutting blades 37 each at the end of a lever member 39. The cutter is held by a fulcrum 41. As is usual in this type of device, by bringing the lever members 39 towards each other the blades 37 are closed so as to cut anything between them. Passing through the fulcrum 41 is a bolt 43 which extends into the longitudinal slit 31. In the slit 31, the bolt is loosely held by washers and a nut 45 so that the bolt can travel vertically up and down and also horizontally along the slit. When the cutter 20 closes, the bolt travels forward; when the cutter 20 opens, the bolt 43 travels rearward. The bolt 43 has a cutter spring 44 which biases the cutter down. The lever members 39 have a forward leg 47 and a rear leg 49. Between the forward and rear legs 47, 49 of each lever member is a joint 51. Attached to each joint 51 is a coupling piece 53 which is a thin flat piece of metal. The two coupling pieces are then joined at their inner ends at a coupling point 55. A control wire 57 is attached to the coupling point 55. As can readily be understood, by pulling on the control wire 57 to the rear, the inner ends of the coupling pieces move to the rear. This pulls the joints 51 towards each other bringing the lever members 39 towards each other and closes the cutter 20. Also, extending between the side brackets 35 is a cross-rod 59. The rear legs 49 of each lever have an aperture 61 so that the rear leg can travel along the cross-rod 59. A lever spring 63 is disposed around the cross-rod 59 so that the rear legs 49 are outwardly biased. When the control wire 57 is pulled, the rear legs travel inwardly towards each other against the force of the spring 63. When the control wire 57 is released, the spring forces the rear legs 49 outwards.

THE SCOOP AND CHUTE ASSEMBLY

Disposed under the upper frame and held by the side brackets 35 is the scoop and chute assembly 21. The scoop 65 consists of a shovel or ladle-like element having a rounded bottom and sides sloping downwards towards a rounded tapered tip. The scoop is disposed so that the tip will extend under the cutting blades. Fruit cut by the blades 37 will fall into the scoop 65. At the rear of the scoop is the scoop coupling 67 which is a cylindrical housing either integral with or fastened to the rear of the scoop. The scoop coupling 67 is the unit which is held by the brackets 35. This scoop coupling 67 has coupling pieces which may consist of belting or other fastening means, e.g., screws to which can be attached a chute 69. The chute 69 consists of a flexible hose, preferably with corrugations so as to provide an accordion-like action. The outer end 71 of the chute will be placed in the receptacle. Indeed, fastening means can be placed at the chute outer end so that it will fasten to the receptacle.

THE SOLENOID CIRCUIT

The cutter assembly 19 will be operated by a solenoid 73 attached to the control wire 57. Solenoid 73 consists of a core 75 and a coil 77 and a core spring 78. The wire 57 is in a protective casing 58 and one end of the wire is attached to the coupling point 55 while the other end is attached to the core 75. The core 75 is biased out of the coil 77 by the core spring 78. When the coil 77 is enabled, it will draw the core against the force of the core spring into the coil, pulling the wire so as to close the cutter 20. The coil circuit is attached to the rear bracket 36 where there is an on-off switch 79. From the on-off switch 79, the circuit goes by wire to one of the cutting blades 37 where there is a first contact 81. Attached to the frame 27 towards the front end 29 is a second contact 83. As the stem of a fruit enters the space between the cutting blades 37, the blades are dropped on the fruit. The fruit thus pushes up the blades against the force of the cutter spring 44 so that the first contact hits the second contact. This closes the circuit. The core 75 is pulled into the coil 77, pulling on the wire 57. The wire in turn pulls the lever members 39 together closing the cutter around the stem and cutting the stem. The fruit drops. The spring 44 biases the cutter downwards so that after the fruit falls, the blade first contact disconnects from the frame second contact and the circuit is again open until the blade is dropped over a second fruit. The foregoing operation is then repeated.

As is readily apparent and shown in the solenoid circuit 23 is a battery 85. Although for sales and demonstration purposes a battery is used, in many cases the battery is not needed. When used, the battery is a nickle-cadmium battery carried in a back-pack. However, usually a vehicle can be brought to within a close proximity of the work site and power can be taken from the vehicle, e.g., the cigarette lighter socket.

OTHER EMBODIMENTS

Figure 12:
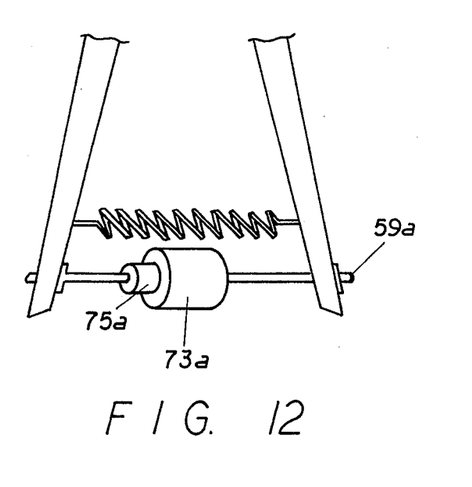
FIG. 12 shows another modification of the apparatus contemplated herein.
Figure 13:
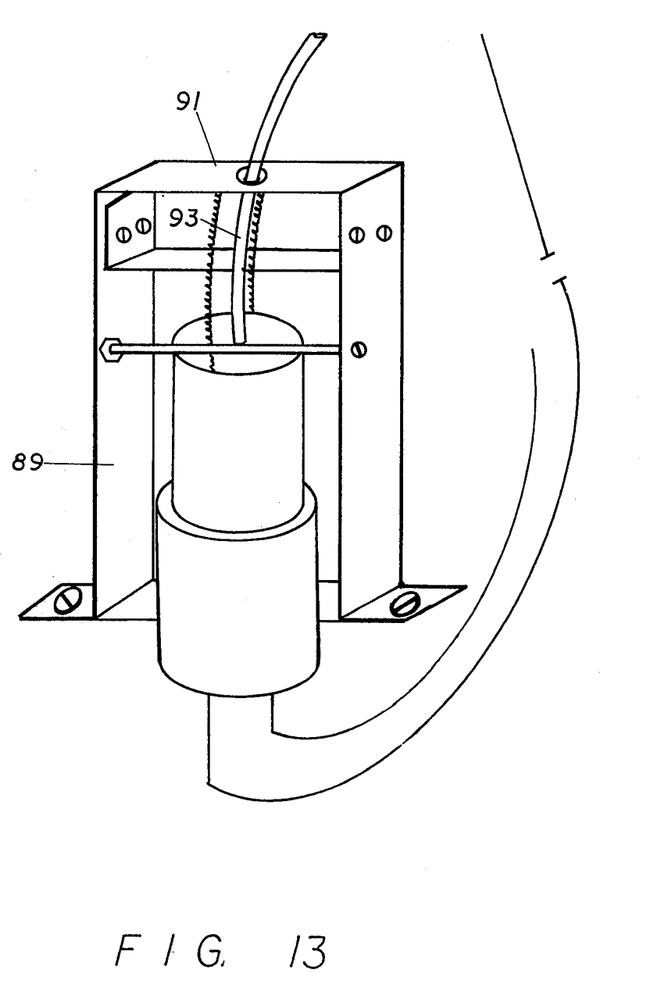
FIG. 13 has still another modification of the apparatus contemplated herein.

In the apparatus heretofore described, the solenoid 73 has been described as operated by a wire 57. This arrangement has certain advantages in that the solenoid and core can be conveniently carried in a back-pack or a side-pack. However, another arrangement is possible. By using appropriate battery power, a smaller solenoid 73a can be used. Solenoid 73a is placed on the cross-rod 59a. The coil 77a is attached to one of the rear legs 49a. Cross-rod 59a is a moveable rod and is attached to the core 75a. The wire 57, joint 51, coupling pieces 52 and coupling point 55 are eliminated. This construction is more compact and avoids the lengthy wire 57 and its protective casing 58. On the other hand, the added weight of the solenoid must be carried by hand.

Another arrangement of advantage is to have a finger trigger. As hereinbefore described, the cutter will close every time the first and second contacts on the blade and frame are pushed together. When working with closely packed branches, it may be of advantage to trigger the blade closing by hand. This is readily accomplished by making the switch 79a, on the rear bracket 36, a three-way switch. In one position, the switch is OFF. In the second position, the switch is connected into the cutter and frame circuit as hereinbefore described. In the third position, the switch 79a is connected to a trigger 87 while the cutter and frame circuit is OPEN. Trigger 87 may be located on the rear bracket 36 or on the handle. By depressing the trigger or pushbutton, the circuit is closed and the cutter is closed.

The solenoid may have an internal spring to bias the core out of the coil. However, it is possible to have a solenoid frame 89 around the solenoid with an upper control tower 91. The spring 93 is thus outside the solenoid and can be readily repaired or adjusted.

WORKING OF SOME COMPONENTS

Figure 6:
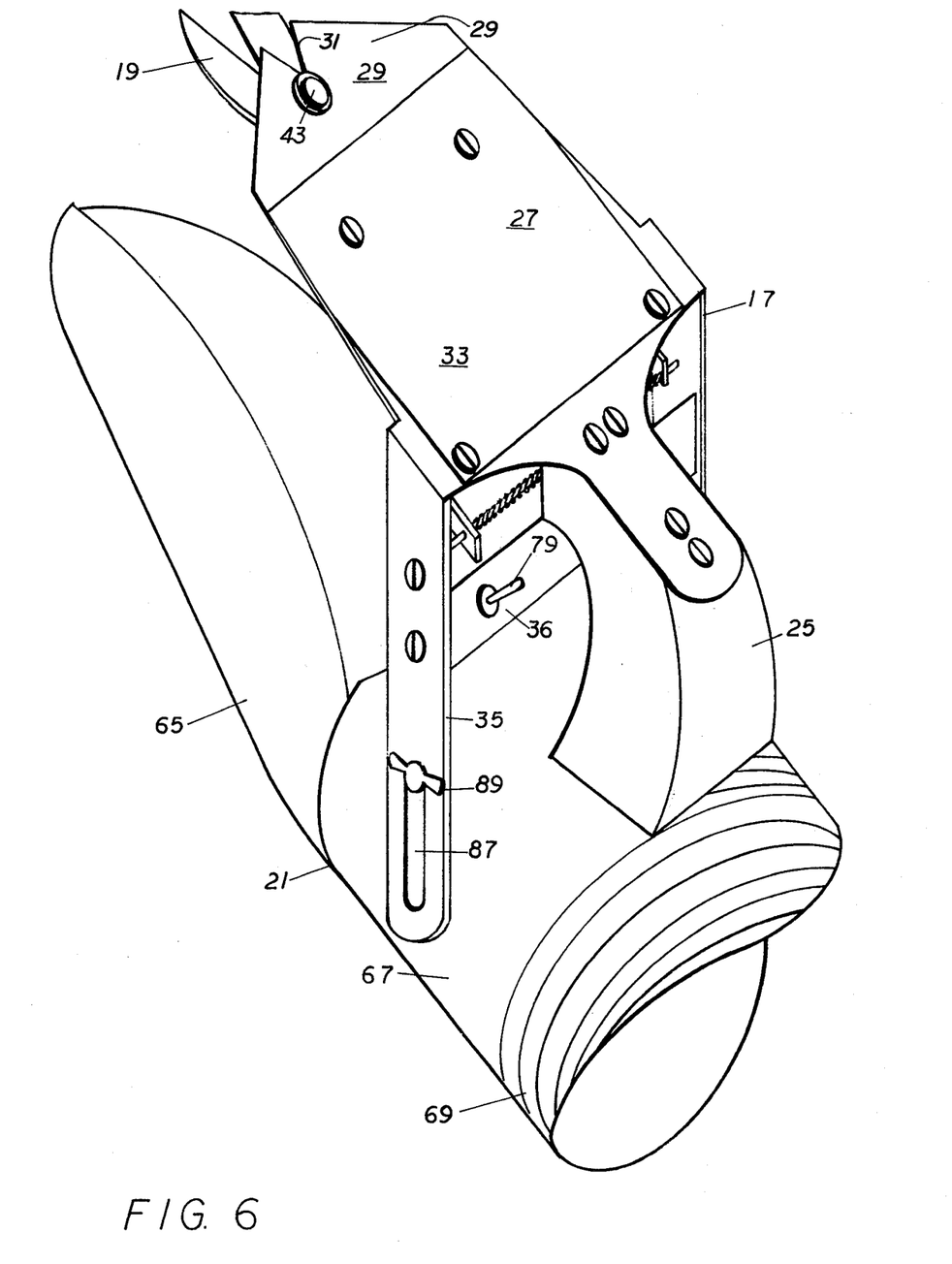
FIG. 6 is a perspective enlarged top view of the fruit cutter.
Figure 7:
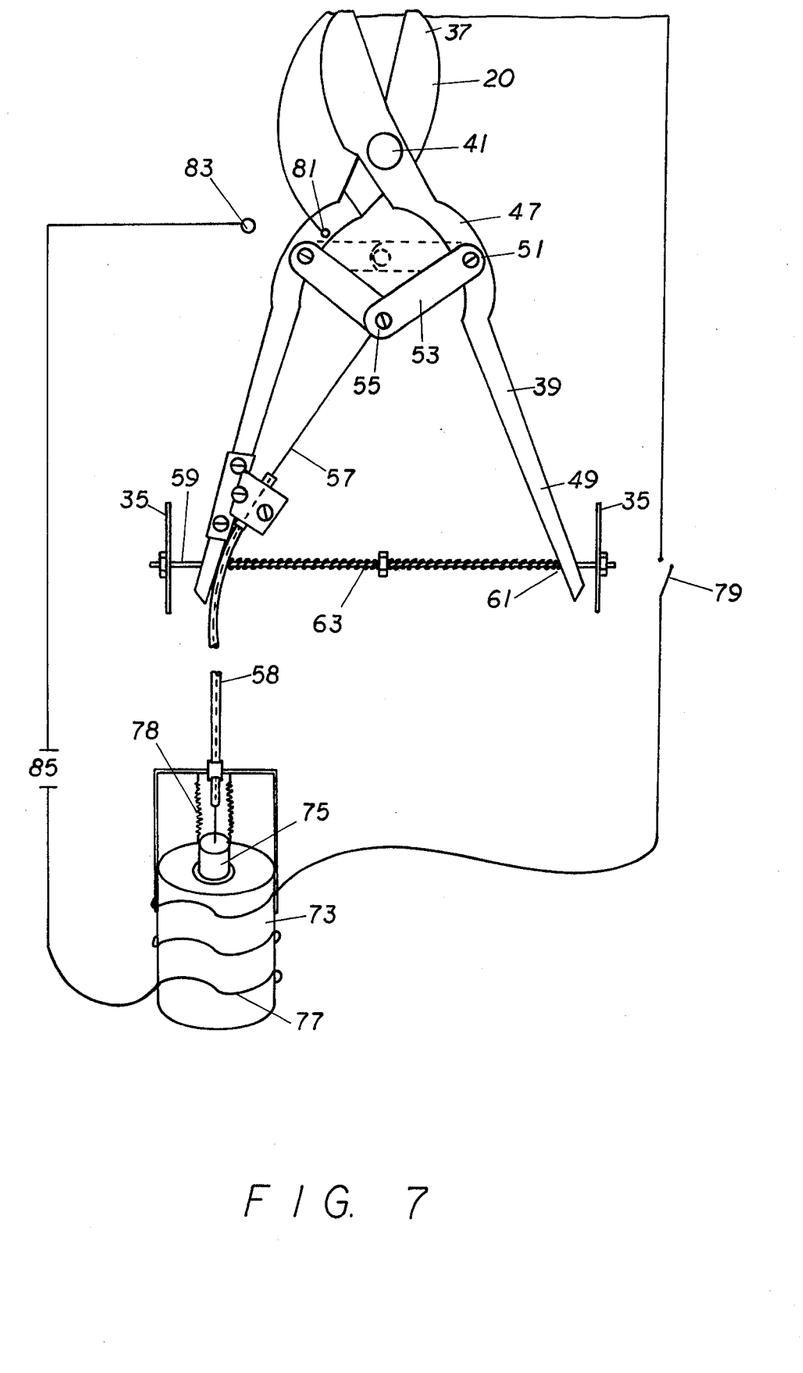
FIG. 7 is a perspective view of a portion of the apparatus herein contemplated without the frame.
Figure 8:
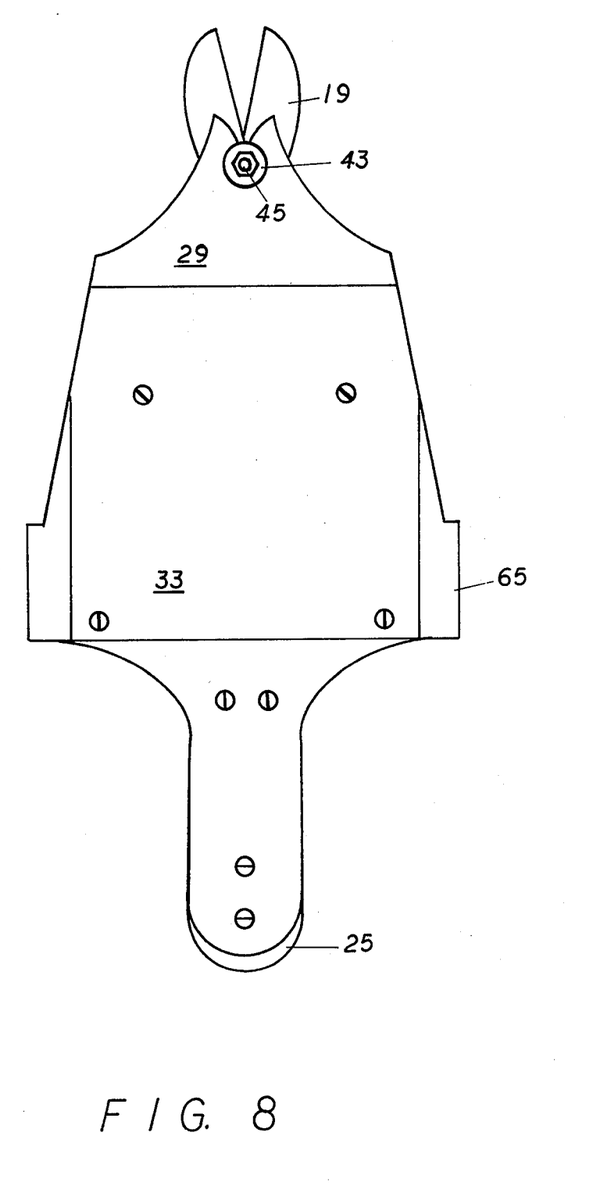
FIG. 8 shows a top view of a part of the apparatus contemplated herein.
Figure 9:
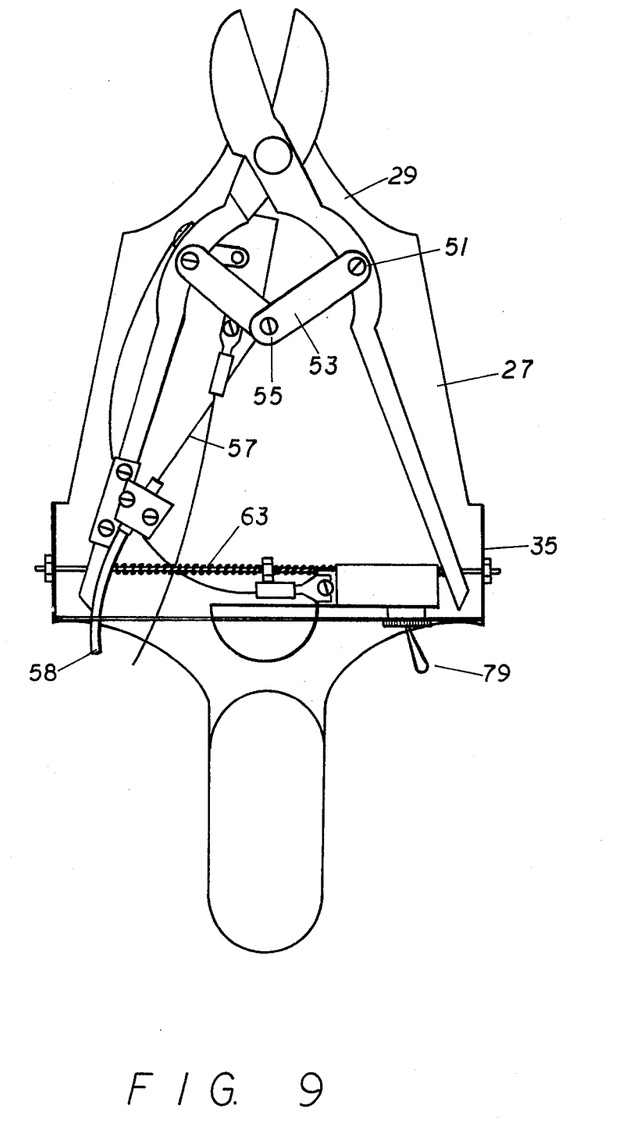
FIG. 9 presents a bottom view of a part of the apparatus contemplated herein.
Figure 10:
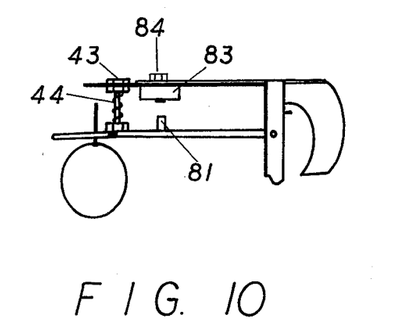
FIG. 10 is a side view illustrating the contacts and spring action herein contemplated.
Figure 11:
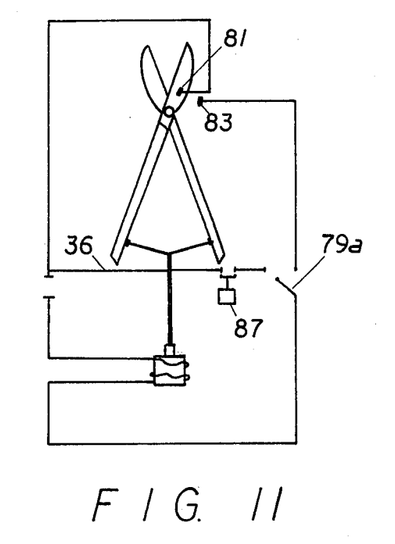
FIG. 11 shows a modification of the apparatus contemplated.

Particular attention is now directed to FIGS. 6 and 9 showing longitudinal slit 31, the spring 44 and the bolt 43. As the cutter blades snap shut the cutter will move forward so that the bolt will travel forward in the slot. Furthermore, as the cutter blades press down on the fruit bolt 43 will move up. Thus, the washers holding the bolt 43 in the travel path must allow for this movement. Spring 44 can be a two-way spring, half biased inwards, half outwards. This arrangement permits the cutter to float above the fruit so that it is not necessary to press down hard on the fruit, the slightest touch tending to raise the cutter blade. One of the contacts, in this case contact 83, is adjustable by a threaded member 84. Thus, the contact can be so set as to be bias triggered.

The apparatus can be adapted to receive various kinds of fruit from small lemons to large grapefruit. This is done by having adjustable means on side brackets 35 such as a slit 87 and a wing nut 89 to set the depth and receiving angle of the scoop.

I claim:

1. A fruit cutter comprising in combination:
   a. a frame assembly (17) with a front end, a travel guide (31) being defined in said front end (29), side brackets (35) on said frame;
   b. a plier-like cutter (20) having blades (37) which can be opened and closed with a fulcrum (41), and rear lever members (39) held on said frame, coupling means (43) coupling said cutter (20) to said travel guide so that said fulcrum can move relative to said travel guide as said blades open and close;
   c. rear spring means (63) coupled to said lever members (39) biasing said lever members so that the cutter blades (37) tend to be open;
   d. solenoid means with a core and coil (75, 77) coupled to said lever members (39) which when actuated will draw the core (75) into the coil (77) drawing the lever members (39) together and closing the cutter (20);
   e. a circuit including contacts, connecting said solenoid means and said cutter whereby on closing of said contacts said cutter will close, cutting a fruit stem, dropping a fruit; and,
   f. a scoop and chute assembly (21) held by said side brackets (35) disposed under said cutter means (20), the fruit dropping into said scoop and chute assembly when cut.

2. A fruit cutter as claimed in claim 1, said contacts including a first contact (81) on said cutter, a second contact (83) on said frame, disposed opposite said first contact so that the downward forcing of said cutter on a fruit will bring said contacts together.

3. A fruit cutter as claimed in claim 2, said spring means (44) between said frame and said cutter biasing said cutter away from said frame.

4. A fruit cutter as claimed in claim 3 wherein said coupling means includes a bolt-like member coupling said cutter to said travel guide, said front spring means being held around said bolt-like member, said bolt-like member being adapated and disposed to travel vertically and horizontally in said travel guide.

5. A fruit cutter as claimed in claim 1, said lever members (39) including coupling pieces, said solenoid means having a wire extending between said core and said coupling pieces, said wire pulling said coupling pieces as said core enters said coil to bring said lever members towards each other closing said cutter.

6. A fruit cutter as claimed in claim 5, including a tower above said solenoid, and, spring means between said tower and said core.

7. A fruit cutter as claimed in claim 1, including a cross rod (59a) between said lever members, at least one of said lever members being adapted and disposed to slide along said cross-bar, said solenoid on said cross-bar with said core and coil, said core being naturally outside said coil, the closing of the contacts causing said core to enter said coil closing the cutter.

* * * * *